US010796250B2

(12) United States Patent
Daughtrey et al.

(10) Patent No.: US 10,796,250 B2
(45) Date of Patent: *Oct. 6, 2020

(54) USER INTERFACE FOR TRAVEL PLANNING

(71) Applicant: GOOGLE LLC, Mountain View, CA (US)

(72) Inventors: Rodney S. Daughtrey, Cambridge, MA (US); Marty Gardner, Melrose, MA (US); Kevin Fox, Jamaica Plain, MA (US)

(73) Assignee: Google LLC, Mountain View, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/130,261

(22) Filed: Sep. 13, 2018

(65) Prior Publication Data

US 2019/0012617 A1  Jan. 10, 2019

Related U.S. Application Data

(63) Continuation of application No. 14/980,851, filed on Dec. 28, 2015, now Pat. No. 10,108,911, which is a continuation of application No. 14/318,286, filed on Jun. 27, 2014, now Pat. No. 9,251,544, which is a continuation of application No. 12/699,622, filed on Feb. 3, 2010, now Pat. No. 8,799,795.

(60) Provisional application No. 61/149,569, filed on Feb. 3, 2009.

(51) Int. Cl.
*G06Q 10/02* (2012.01)
*G06Q 30/06* (2012.01)
*G06Q 50/14* (2012.01)
*G06Q 10/10* (2012.01)
*G06F 3/0484* (2013.01)
*H04L 12/24* (2006.01)

(52) U.S. Cl.
CPC .......... *G06Q 10/02* (2013.01); *G06F 3/0484* (2013.01); *G06Q 10/10* (2013.01); *G06Q 10/1093* (2013.01); *G06Q 30/0641* (2013.01); *G06Q 50/14* (2013.01); *H04L 41/22* (2013.01); *Y10S 715/963* (2013.01)

(58) Field of Classification Search
CPC .... G06Q 10/02; G06Q 30/0641; G06Q 10/10; G06Q 50/14; G06Q 10/1093; G06F 3/0484; H04L 41/22
See application file for complete search history.

(56) References Cited

U.S. PATENT DOCUMENTS

| 3,815,269 A | 6/1974 | Roselli |
| 6,307,572 B1 | 10/2001 | DeMarcken et al. |
| 6,397,212 B1 | 5/2002 | Biffar |
| 6,801,226 B1 | 10/2004 | Daughtrey |
| 7,263,664 B1 * | 8/2007 | Daughtrey ............ G06F 3/0481 715/760 |

(Continued)

OTHER PUBLICATIONS

Song, "U.S. Office Action issued in copending U.S. Appl. No. 12/699,622, filed Feb. 3, 2010", dated Jun. 29, 2012, 11 pages.

(Continued)

*Primary Examiner* — Daeho D Song
(74) *Attorney, Agent, or Firm* — Dority & Manning, PA

(57) ABSTRACT

A computer-implemented method and system provides an interactive interface for displaying results of flexible travel planning queries is described.

18 Claims, 12 Drawing Sheets

(56) References Cited

U.S. PATENT DOCUMENTS

| | | | |
|---|---|---|---|
| 7,296,232 B1* | 11/2007 | Burdick | G06Q 10/109 |
| | | | 715/738 |
| 7,346,526 B2 | 3/2008 | Daughtrey et al. | |
| 7,379,889 B2* | 5/2008 | Ratzlaff | G06Q 10/109 |
| | | | 705/7.18 |
| 7,415,419 B2* | 8/2008 | Widjaja | G06Q 10/02 |
| | | | 705/5 |
| 8,050,936 B1* | 11/2011 | Jamotta | G06Q 10/10 |
| | | | 701/532 |
| 8,392,224 B2* | 3/2013 | Crean | G06Q 30/0603 |
| | | | 705/400 |
| 8,484,057 B2* | 7/2013 | Crean | G06Q 30/0629 |
| | | | 705/1.1 |
| 8,566,151 B2* | 10/2013 | Baggett | G06Q 10/02 |
| | | | 705/14.1 |
| 8,620,735 B2* | 12/2013 | Khoo | G06Q 30/02 |
| | | | 705/14.1 |
| 8,788,303 B1 | 7/2014 | Krone et al. | |
| 8,799,795 B2 | 8/2014 | Daughtrey et al. | |
| 9,251,544 B2 | 2/2016 | Daughtrey et al. | |
| 2002/0010604 A1 | 1/2002 | Block | |
| 2003/0052915 A1* | 3/2003 | Brown | G06Q 10/109 |
| | | | 715/752 |
| 2004/0078252 A1* | 4/2004 | Daughtrey | G06F 16/2428 |
| | | | 705/5 |
| 2004/0268270 A1 | 12/2004 | Hill et al. | |
| 2005/0039142 A1 | 2/2005 | Jalon et al. | |
| 2005/0043974 A1 | 2/2005 | Vassilev et al. | |
| 2005/0086087 A1* | 4/2005 | Razza | G06Q 10/02 |
| | | | 705/5 |
| 2005/0138631 A1 | 6/2005 | Bellotti et al. | |
| 2005/0246666 A1 | 11/2005 | Kalinoski et al. | |
| 2006/0053055 A1 | 3/2006 | Baggett et al. | |
| 2006/0095868 A1 | 5/2006 | Sawada et al. | |
| 2006/0156259 A1 | 7/2006 | Wagner et al. | |
| 2006/0224607 A1* | 10/2006 | Tchaitchian | G06F 40/154 |
| 2006/0236269 A1 | 10/2006 | Borna | |
| 2007/0073562 A1 | 3/2007 | Brice et al. | |
| 2007/0143155 A1 | 6/2007 | Whitsett et al. | |
| 2007/0157128 A1 | 7/2007 | Haug | |
| 2007/0168892 A1 | 7/2007 | Brush et al. | |
| 2007/0186193 A1 | 8/2007 | Curran | |
| 2007/0198310 A1 | 8/2007 | Crean et al. | |
| 2007/0256035 A1 | 11/2007 | Matsuzawa et al. | |
| 2008/0016442 A1 | 1/2008 | Khoo | |
| 2008/0115088 A1 | 5/2008 | Frankel et al. | |
| 2008/0163079 A1 | 7/2008 | Haug | |
| 2008/0167973 A1 | 7/2008 | De Marcken | |
| 2008/0222566 A1 | 9/2008 | Daughtrey et al. | |
| 2008/0319822 A1 | 12/2008 | LaJoie et al. | |
| 2009/0216633 A1 | 8/2009 | Whitsett et al. | |
| 2009/0248458 A1 | 10/2009 | Ouellette et al. | |
| 2009/0249418 A1* | 10/2009 | Alastruey Gracia | |
| | | | H04N 21/2665 |
| | | | 725/114 |
| 2009/0313055 A1 | 12/2009 | Martin et al. | |
| 2009/0319322 A1 | 12/2009 | Lee, II | |
| 2010/0198628 A1 | 8/2010 | Rayner | |
| 2010/0313152 A1 | 12/2010 | Daughtrey et al. | |
| 2014/0310043 A1 | 10/2014 | Daughtrey et al. | |
| 2016/0110660 A1 | 4/2016 | Daughtrey et al. | |

OTHER PUBLICATIONS

Song, "U.S. Office Action issued in copending U.S. Appl. No. 12/699,622, filed Feb. 3, 2010", dated Sep. 17, 2012, 11 pages.
Song, "U.S. Office Action issued in copending U.S. Appl. No. 14/318,286, filed Jun. 27, 2014", dated Jun. 3, 2015, 13 pages.
U.S. Appl. No. 14/318,286 to Daughtrey et al. filed Jun. 27, 2014.
U.S. Appl. No. 14/980,851 to Daughtrey et al. filed Dec. 28, 2015.
U.S. Appl. No. 12/699,622 to Daughtrey et al. filed Feb. 3, 2010.

* cited by examiner

CHOOSE YOUR FLIGHTS

BOOK FLIGHTS — SEARCH — FLIGHTS — TRAVELERS — SEATS — OPTIONS — PAYMENT

MY ACCOUNT | CHECK IN | FLIGHT STATUS

SIGN IN   CREATE ACCOUNT

MONTH AT A GLANCE - BOSTON (BOS) TO SAN FRANCISCO (SFO)

DEPARTING IN   LENGTH OF STAY
JANUARY 2009 ▼   5-7 NIGHTS (EX. 5, 7-9)   [UPDATE]

JANUARY 2009
LOWEST ROUND-TRIP FARES FOR A 5-7 NIGHT TRIP DEPARTING ON THE DATE SHOWN

| SUN | MON | TUE | WED | THU | FRI | SAT |
|---|---|---|---|---|---|---|
|  |  |  | 1 $560 | 2 $495 | 3 $495 | 4 $460 |
| 5 $580 | 6 $460  5 NIGHTS $472 / 6 NIGHTS $515 / 7 NIGHTS $460 | 7 $515 | 8 $540 | 9 $505 | 10 $585 | 11 $625 |
| 12 $625 | 13 $660 | 14 $505 | 15 $505 | 16 $495 | 17 $515 | 18 $525 |
| 19 $460 | 20 $550 | 21 $460 | 22 $460 | 23 $460 | 24 $460 | 25 $460 |
| 26 $460 | 27 $460 | 28 $460 | 29 $460 | 30 $460 | 31 $460 |  |

[SHOW FLIGHTS]

STOPS
☑ NON-STOP
☑ 1 STOP
☑ 2 STOPS

CARRIERS
☑ ALL CARRIERS
☑ AIRTRAIN
☑ ALASKA AIRLINES
☑ AMERICAN
☑ CONTINENTAL
☑ DELTA
☑ NORTHWEST
☑ UNITED
☑ US AIRWAYS

OVERNIGHT
☑ ALLOW OVERNIGHT FLIGHTS

June 8 departures

| Airlines | Flight Times | | | | | |
|---|---|---|---|---|---|---|
| | Delta Air Lines | United Air Lines | Continental Air Lines | US Airways | American Airlines | America West | Sun Country | Multiple airlines |
| Options from $309 | From $309 | From $2324 | - | - | - | - | - | |
| Nonstop | - | From $316 | - | From $315 | From $315 | From $321 | - | From |
| One stop | | | From | | | | | |

June 8 departures: All options

| Sort by → | Cost | Airline | From/To | Stops | Date | Flight times | Duration | Class | Warnings |
|---|---|---|---|---|---|---|---|---|---|
| 1 | Details $309 | Delta | BOS to LAX<br>LAX to BOS | nonstop<br>nonstop | Fri, June 8<br>Wed-June 13 | 5:55p-9:10p<br>7:35a-4:10p | 6h 15m<br>5h 35m | Coach<br>Coach | unknown seat availability |
| 2 | Details $312 | Continental | BOS to LAX<br>LAX to BOS | EWR<br>PHX, IAH | Fri, June 8<br>Wed-June 13 | 1:00p-6:45p<br>11:13a-11:45p | 8h 45m<br>9h 32m | Coach<br>Coach | unknown seat availability |
| 3 | Details $315 | US Airways | BOS to LAX<br>LAX to BOS | PIT<br>PIT | Fri, June 8<br>Thur-Fri, June 14-15 | 12:05p-4:30p<br>1:35p-12:08a | 7h 25m<br>7h 33m | Coach<br>Coach | unknown seat availability |
| 4 | Details $315 | American | BOS to LAX<br>LAX to BOS | JFK<br>nonstop | Fri, June 8<br>Thur, June 14 | 2:30p-8:07p<br>7:45a-4:23p | 8h 37m<br>5h 38m | Coach<br>Coach | unknown seat availability<br>prop plane segment |
| 5 | Details $316 | United | BOS to LAX<br>LAX to BOS | ORD<br>nonstop | Fri, June 8<br>Thur-Fri, June 14-15 | 1:30p-7:46p<br>10:25p-6:47a | 9h 16m<br>5h 22m | Coach<br>Coach | unknown seat availability<br>overnight flight |
| 6 | Details $321 | America West | BOS to LAX<br>LAX to BOS | PHX<br>LAS | Fri, June 8<br>Wed-Thur, June 13-14 | 9:52a-4:01p<br>8:00p-7:29a | 9h 9m<br>8h 29m | Coach<br>Coach | unknown seat availability<br>overnight flight |

USER INTERFACE FOR TRAVEL PLANNING

This application is a continuation of U.S. application Ser. No. 14/980,851 filed Dec. 28, 2015 and entitled "User Interface for Travel Planning," which is a continuation of U.S. application Ser. No. 14/318,286 filed Jun. 27, 2014 and entitled "User Interface for Travel Planning," which is a continuation of and claims priority to U.S. patent application Ser. No. 12/699,622, filed on Feb. 3, 2010 and entitled "User Interface for Travel Planning", which claims priority to U.S. Provisional Application Ser. No. 61/149,569, filed Feb. 3, 2009, and entitled "User Interface for Travel Planning." The entire contents of the above-identified applications are hereby fully incorporated herein by reference.

BACKGROUND

This invention relates to travel planning.

In travel planning, such as for air travel scheduling and pricing, low-fare-search queries are posed by users from travel agent systems, airline reservation agent systems, travel web sites, and airline-specific web sites. Low-fare-search (LFS) queries typically include origin and destination information, time constraints and additional information including passenger profile and travel preferences. Travel planning computer systems respond to these LFS queries by determining a set of one or more flights between an origin and destination and a fare that can be used with the flights based on evaluation of fare rules. The fares are typically fare records published by a provider such as ATPCO and include inter alia a fare price. The travel planning systems typically return a list of possible tickets (travel options), each having flight and fare price information.

One technique for displaying this flight and fare price (price) information is disclosed in my issued U.S. Pat. No. 6,801,226, entitled: "Graphical User Interface For Travel Planning System." One type of travel planning involves processing of flexible date travel planning queries that can be of the LFS type. One technique for displaying flight and price information for flexible date travel planning is disclosed in my issued U.S. Pat. No. 7,346,526.

SUMMARY

Aspects of the invention include techniques involving computer-implemented methods, software and/or apparatus for displaying travel planning information and include transmitting by a computer system a user interface, the user interface including a depiction of a calendar view of a month, the depiction of the calendar view including date cells corresponding to days of the month and an indicator that graphically traverses selected date cells that correspond to a selected length of stay, in response to a user indicating a date of departure.

Transmitting includes transmitting computer instructions for causing a client system to render the user interface on a display of the client system. The techniques include transmitting computer instructions for causing the client to render on the display, the visual indicator demarcating the day that the user would be at their destination for travel on the day of departure for the selected length of stay with the instructions configurable by client data including a preliminary selection of a day of departure corresponding to one of the date cells. The selected length of stay is a first length of stay, techniques further include transmitting computer instructions for causing the client to render on the display, new values in the date cells, the new values corresponding to the cheapest fares for a mode of travel departing on the days represented by the date cells for a second length of stay, with the instructions configurable by client data including the second length of stay that is different from the first length of stay.

The techniques further include transmitting computer instructions for causing the client to render on the display, visual effects for uniquely indicating the date cells corresponding to a journey, the journey including the day of departure, the day of return as determined by the selected length of stay and the day of departure, and any intervening days, with the instructions configurable by client data including an active selection of a day of departure corresponding to one of the date cells. The techniques further include generating the user interface by a computer system and transmitting the user interface to a client system to render the user interface on a display of the client system.

The techniques further include transmitting instructions for causing a client to render on the display a filter region juxtaposed the calendar view, the filter region comprising a plurality of filter elements that enables a user to select or de-select one or more of the filter elements in the region causing a concomitant change in fare prices rendered in the calendar view according to the filter elements selected. The techniques further include receiving data from a user indicating device that indicates a user's selection of a departure day. The indicating device is a computer mouse, a trackball, a touch pad, keyboard or similar device.

The techniques provide for displaying answers to travel planning queries such as fixed date or "flexible" travel queries in which the departure date, the length of stay at the travel destination, and/or both are indeterminate. The techniques implement a variety of ways for displaying results generated in response to different kinds of flexible travel queries. These techniques make use of an interactive user interface for enabling users to easily pose queries that match the scheduling flexibility, while displaying the results in an informative and understandable manner depending on the type of flexible travel query posed.

The techniques provided by the system include various categories of techniques, which may be invoked separately or in various combinations. For example, included are techniques that enable users to easily see the length of stay associated with a particular calendar journey departure date, in an interactive fashion.

These techniques can communicate the following information to the user to obtain the specified fare price for a journey:

1) which day of the month on the calendar the user will need to depart,
2) the number of nights that the user would stay at the destination, and
3) the day of the month on the calendar that the user would need to return.

Also included are techniques that enable users to select the beginning date of a specified length of stay, after which the beginning date of the trip, the length of stay at the destination, and the departure date from the destination will be indicated on the calendar itself. Additional techniques include enabling users to view and select from, for a given journey, departure calendar date, various length of stays at the destination, displaying, for each length of stay, data related to that length of stay (e.g. the cheapest price for the journey for the given departure date and length of stay). Additional techniques include enabling users to understand information about a length of stay for a journey in situations where the return date for the journey is not presented on a calendar on a user interface. For example, a journey having a departure date of April 15 with a 30-night length of stay, will indicate a May 15 return date, e.g., as text. However, no May calendar appears on the screen, thus May 15 is not presented in the calendar.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3-10 are different views of a user interface for presenting flexible travel results.

FIG. 11 is a screen shot of a web page that depicts a list of travel options (prior art).

DETAILED DESCRIPTION

Figure 1:
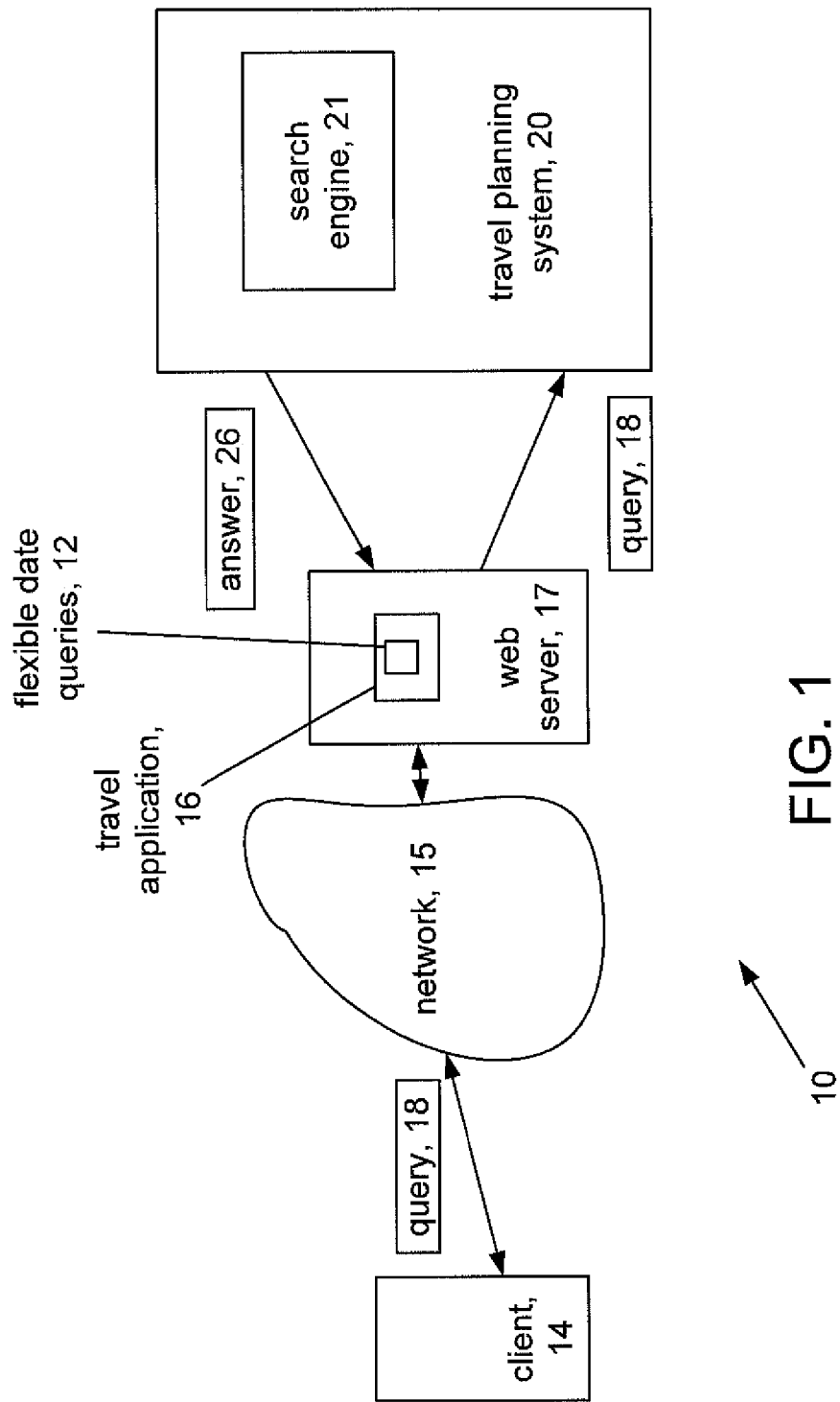
FIG. 1 is a block diagram of a travel planning arrangement.

Referring to FIG. 1, an arrangement 10 for travel planning includes a processor 12 to process flexible-date queries. A user such as a traveler, travel agent or airline reservation agent enters trip information typically including date and airport (i.e. origin and destination) information from a client system 14 into a travel application 16. The client 14 runs a browser or other interface. The client can be a travel agent terminal, an Internet web browser connected to a travel web site, and so forth. Queries 18 from the client are fed via a network 15 to the travel application 16. Network 15 can be any type of network such as a public network such as the Internet or telephone system or a private network such as a local area network (LAN), wide area network (WAN), virtual private network (VPN), and so forth. The travel application 16 resides on a server, e.g., a web server 17. To process flexible-date queries, the travel application 16 allows a wide range of travel dates to be specified.

The travel application 16 interprets queries 18 that arrive from the client 14, sends the queries 18 to a travel planning platform 20 and, organizes results from the travel planning platform 20 into a formatted output such as HTML, and sends the results back to the client 14. The travel application 16 composes query information into an appropriately formatted query, e.g., a low-fare-search query 18 that is sent to a travel planning platform 20. The travel planning platform 20 includes a search engine or search process 21 that searches for flight and fare combinations that satisfy the query, whether it, is a fixed dates (where dates of departure and return are specified) or a flexible date query.

The search performed by the search engine 21 in the travel planning platform 20 can use any of several known techniques, including those described in application Ser. No. 10/272,521, filed Oct. 16, 2002, now U.S. Pat. No. 7,346,526, and entitled "Flexible-Date Travel Queries," the contents of which are incorporated herein by reference in their entirety. The results comprise travel options that include sets of flights or flight segments and fares that are usable with the flights/flight segments. The results are summarized in a GUI as will be described below for a flexible date query. The GUI can also display results of fixed dates queries.

Flexible date queries involve inexact dates of travel. For instance, examples of flexible date queries include earliest possible departure date, latest possible departure date, earliest possible return date, and latest possible return date. This approach results in a number of trip combinations proportional to the product of the outbound date range and the return date range. Another approach uses travelers' trips being constrained in duration, even if the travelers are flexible in, e.g., departure date. Practical queries of this type resemble the following:

"visit Daytona Beach for about a week sometime this winter"

"visit Burlington for a short weekend in October"—

"go to Chicago for a day trip some day next week"

"get a one-way ticket to San Francisco anytime this month"

In each of these examples, while the range of possible travel dates is quite wide, the duration or length of time spent at the destination is specified with some precision. In this type of flexible date query, the user specifies the desired duration in one of a number of manners. Forms of layover length include "a day trip", "weekend trip", "month-long trip", and so forth. This specification is selected from a menu or entered in a text field. In any event, using any of the aforementioned schemes, or other schemes a travel planning system with flexible date processing capability returns answers that are displayed to the user.

Figure 2:
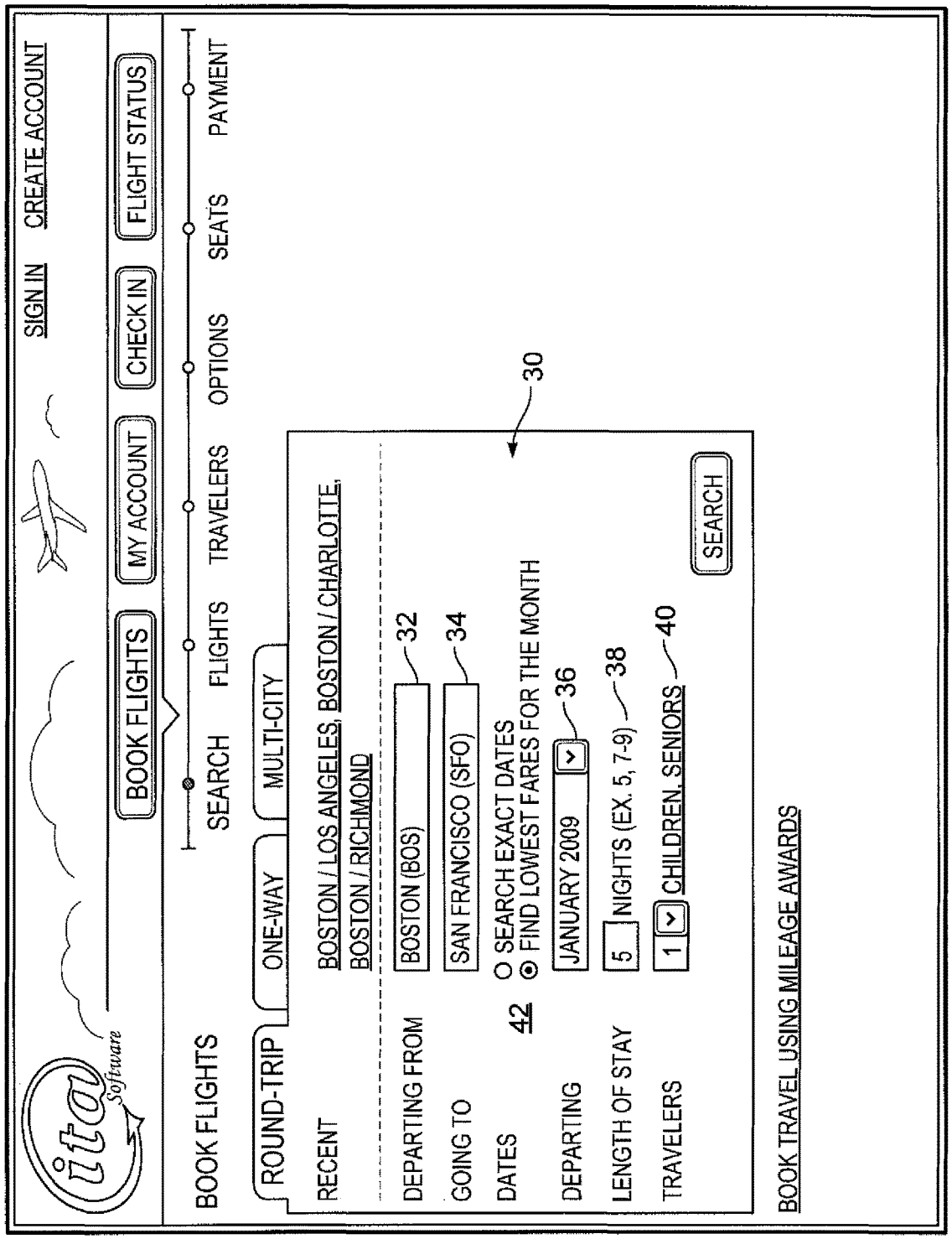
FIG. 2 is an interface for flexible travel queries.

Referring to FIG. 2, a travel specification graphical user interface (GUI) 30 that is generated by the travel application 16 in the travel system 10 controls interface, query specification, search engine parameter settings, results database management, and results presentation for processing travel queries. In some implementations, the travel specification GUI 30 has separate panes for processing one-way, round-trip, and multi-city queries.

The travel specification GUI includes query fields into which a user enters information to be included in a travel planning query. The fields include an origin 32, destination 34, a month of departure 36, a length of stay 38, and the number of passengers 40. The travel specification GUI presents a user with the option 42 to either search for exact dates of travel (fixed dates query) or to search over flexible dates of travel (flexible date query) within a selected month to find the lowest available fares. Within the length of stay field, a user inputs an exact number of nights or a range of nights, e.g., 7-9 nights. If the exact dates of travel are specified (fixed dates query) then a field (not shown) is produced on the GUI for inputting the date of the return flight and the duration field is not presented or active (if present).

In the specific example shown in FIG. 2, the user has selected a flexible date travel planning query involving a trip from Boston to San Francisco, departing in January 2009, staying 5 nights, for one passenger, and has selected the option to find lowest fares for the month. A "Search" button launches the query and sends it to the travel application 16 for transmission to the travel planning platform 20. The travel planning platform 20 produces results based on the query using any of the aforementioned approaches described above or other approaches, and sends the results back, e.g., to the travel planning application 165.

Figure 3:
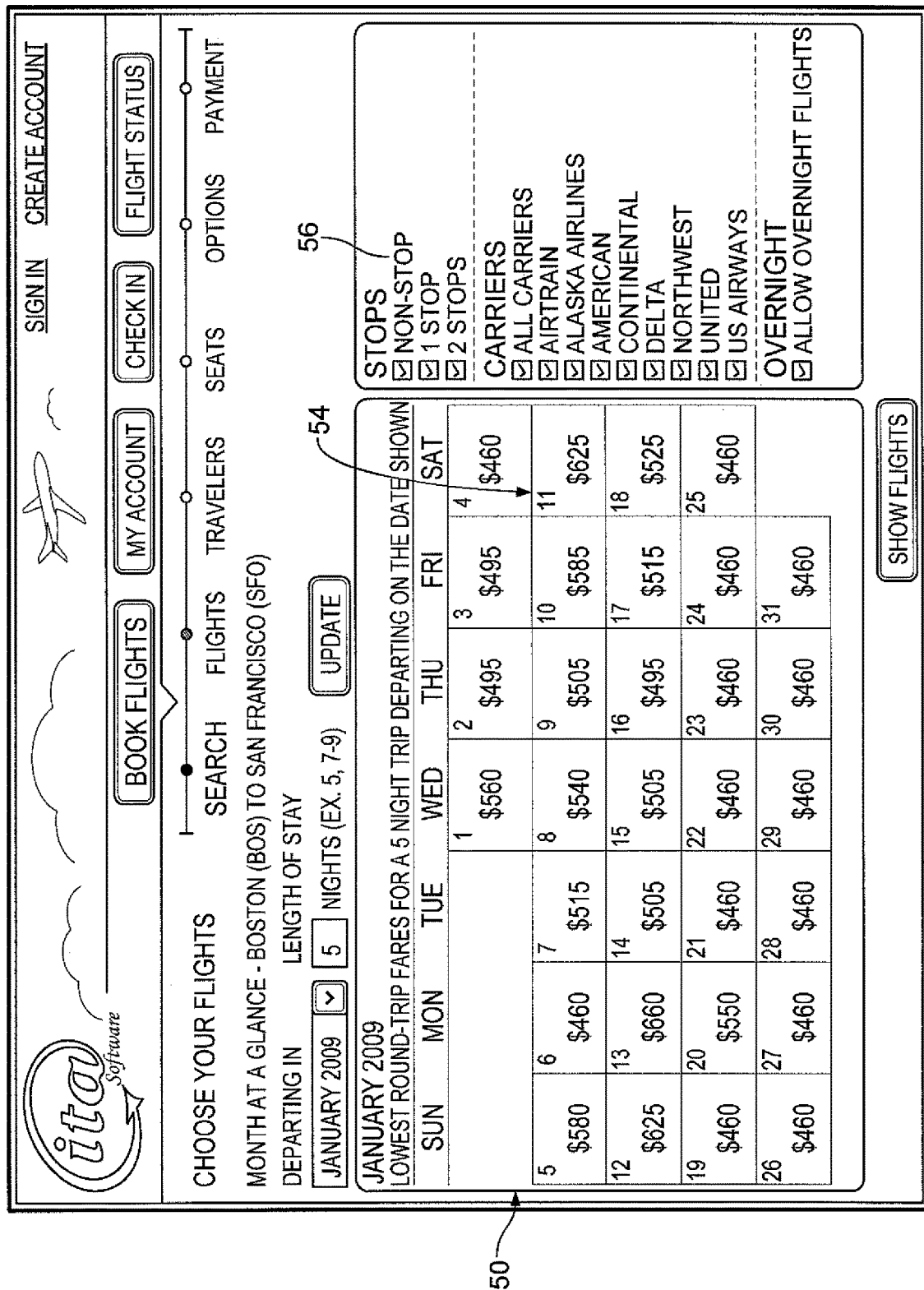

Referring to FIG. 3, a results GUI 50 rendered as a calendar 52 is generated by the travel application 16 presenting the results received from the travel planning platform 20 that satisfy the query received by the travel specification GUI of FIG. 2. Processes performed by the travel application 16 and travel planning platform 20 for retrieving travel options satisfying a flexible travel query are described in the above referenced patent (U.S. Pat. No. 7,346,526), and incorporated herein by reference. Other processes can be used.

The fare price in each date cell 54 of the calendar 52 shown in FIG. 3 is, e.g., the price of the cheapest option which departs on that date of the month and with the selected length of stay. In some implementations, the fare prices in the cells are active hyperlinks (discussed further below), whereas in others the fare prices are merely rendered values. In the specific example shown, the price "$460" on January 6 indicates that $460 is the cheapest option for departing on January 6, and returning on January 11 (a 5-night stay). The results GUI 50 indicates which days of the month offer the lowest available fare, for a selected length of stay, for example, by applying an indicium, e.g., a highlight to the lowest prices. Examples of indicia include displaying the text in bold and/or uniquely colored text or a different font, etc. Also included in FIG. 3 is a filter region 56 that filters from the GUI travel options that do not meet the criteria shown in the filter region 56.

Figure 4:
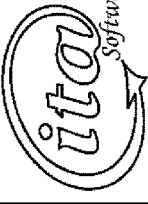

Referring to FIG. 4, if the user waves a cursor generated by the client device, e.g., via interaction with the GUI 50 using an user indicator device, mouse, pad, keyboard, etc., over a particular date cell 54 in the calendar 52, e.g., over the 7th of January, then an indicator 58 of the length of stay, here a line segment is produced and rendered in the user interface 50. The indicator 58 has one end that begins on the 7th of January, extends across 5 nights, and ends on January 12. When a cursor is placed over or within a date cell, that date cell is considered a preliminary selection for a departure date. The length-of-stay indicator is a visual indicator that efficiently and clearly demarcates, at a glance, the days that the user would be at their destination, if they chose to depart on a particular date, e.g., January 7, and stay for the selected number of nights, e.g., 5 nights. The indicator 58 reduces the possibility of a user miscounting the number of days of a trip or choosing the incorrect return date for a particular departure date and length of stay.

In some embodiments, such as that shown in FIG. 4, the visual indicator is a line spanning the date cells corresponding to the days of a potential trip with the endpoints of the line positioned within the date cells corresponding to the departure and return dates. Other graphical indicators could be used such as changing the color, fonts or other visual characteristics of the cells corresponding to the days of a potential trip. Other indicia could be used such as applying some highlight across the expanse of the set of date cells that correspond to the trip.

Figure 5:

Referring to FIG. 5, as the user moves the cursor out of the January 7 calendar date cell, and into other date cells, the screen is updated with a new position for the indicator 58 to display the length of stays for trips starting on these other dates. The results GUI 50 of FIG. 5 shows the screen after the user has moved the cursor into the January 23 date cell.

The user can select a different length of stay at any time by increasing or decreasing the value shown in the "length of stay" text box above the calendar and pressing the "Update" button. In response to receiving the update request, the travel application 16 updates the calendar 52 to show the cheapest fares departing on each day of the month with the newly selected length of stay. The visual indicator 58 is also updated to correspond to the new "length of stay" when the user waves the cursor over the various calendar date cells 52.

Figure 6:

Referring to FIG. 6, the results GUI 50 shows the selection of a beginning date of a trip and a specified length of stay, via the indicator 58. Once the user has found a particular departure date and length of stay that the user would like to explore further, some embodiments of the interface 50 enable the user to actively select that desired departure date and length of stay, e.g., by clicking on a departure date cell with the mouse or by activating other controls. Upon receiving a user's selection, the travel application 16 renders a highlight 62 of the date cells corresponding to the selected departure date and length of stay (including the return date) in the results GUI 50. In general, the highlight 62 used at this point would be different than any highlight used prior to selection of a particular departure date. In the example shown, the date cells corresponding to January 23-28 are highlighted, where January 23 is the departure date and January 28 is the return date. The highlight 62 applied is a shading that is applied to the cells that depicts the cells as depressed. Other highlights could be used.

Figure 7:
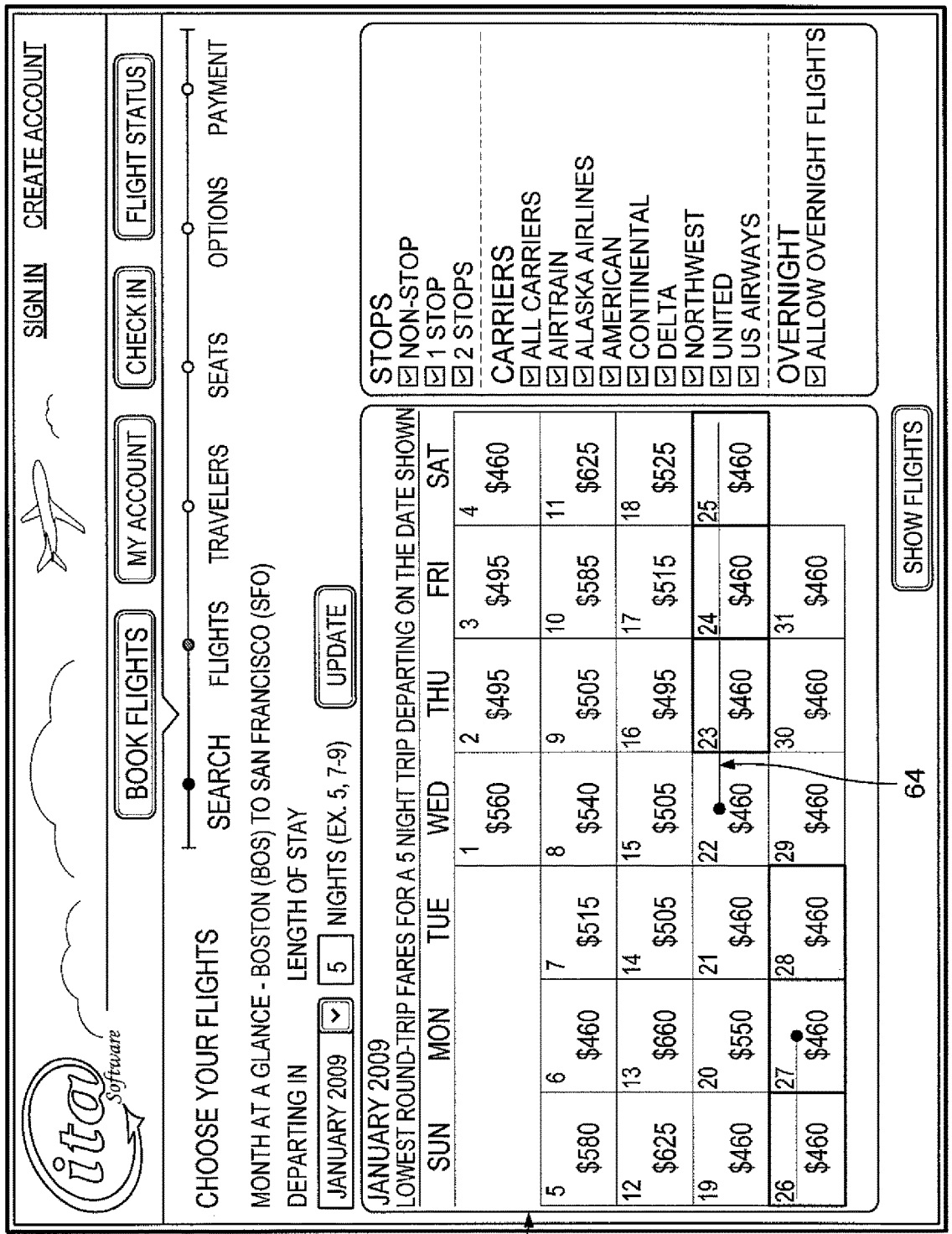

Referring to FIG. 7, the results GUI 50 displays another indicator 64 for an alternative departure date/length of stay selection even when an existing departure date/length of stay has already been actively selected via the highlight 62. Even with the region from January 23-28 selected as shown in FIG. 6, when the user moves the cursor over other calendar departure dates, the results GUI shows other possible departure date/length of stays, as explained before with respect to FIGS. 4-5. In the example shown in FIG. 7, an alternative possible departure date/length of stay is January 22-27. The user could opt to select this alternative trip. Such action would deselect the current selection, removing the highlight 62 from the corresponding date cells, and instead highlight the date cells corresponding to the alternative trip (not shown).

Referring to FIG. 8, the results GUI shows in a region 68 fares corresponding to there different lengths of stay for a given departure date. January 6 in this particular example. If the user has specified a range of nights in the "Length of stay" text field above the calendar, rather than a single number of nights (e.g. "5-7" nights, instead of just "5" nights), then the interface will display each length of stay option for the departure date under consideration, along with other related data for each length of stay option, such as the cheapest price for a journey with that length of stay.

As shown in FIG. 8, the currently selected length of stay associated with the fare for the hovered-over date, i.e., a preliminary date selection, is indicated (here, in bold) along with the fares corresponding to alternative lengths of stay that are within the selected range. The GUI 50 presents the alternative lengths of stay for the same departure date as links 70 that, when selected, display the associated fare for that length of stay in the calendar date cell. The bar indicator 58 is depicted as spanning eight cells because the user has selected the seven (7) nights stay option in the window.

Figure 9:

Referring to FIG. 9, the results GUI 50 shows a user selection of a departure date and a length of stay selected from a range of possible lengths of stays, via the indicator 58. Similar to the example described with respect to FIG. 6, after receiving a user's selection, the highlight 62 is applied to the date cells of FIG. 9 that correspond to the selected departure date and length of stay, including the return date. If this new fare is not the lowest fare for any length of stay for this date, the lowest possible fare for this date is still shown, yet indicated as being inapplicable (e.g., with strikethrough notation) in the cell, along with the fare for the currently selected length of stay. This same technique is used regardless of whether or not there is a currently selected departure date and length of stay on the calendar. In the specific example shown in FIG. 9, the 5-night stay option is selected. The results GUI shows that a fare of $472 corresponds to the 5-night stay option; however, it also indicates that a cheaper fare (i.e., $460) is available for the 7-night stay option even though it is shown as being inapplicable because the user has not selected the 7-night stay.

Figure 10:

Referring to FIG. 10, the results GUI 50 shows a length of stay that extends past the end of the calendar month of the departure date. In some cases, the length of stay for a preliminarily selected departure date or an actively selected departure date will extend past the end of the calendar month that is currently being shown in the GUI. FIG. 10 shows a specific example in which the user is considering a 5-night stay departing on January 30 and returning February 4. In this case, since the days in February are not presented in the results GUI, which shows one month at a time, the results GUI 50 depicts the indicator as a ray 70, that is it presents the indicator as a line with an arrow head pointing to the right on January 31 to indicate that the length of stay extends into February along with a textual note 72 to indicate the number of nights in the length of stay, as well as the day of the week and date of the return flight. Alternatively, the GUI can be configured to display 2 months or at least a portion of a succeeding month, and have the indicator be drawn into the succeeding month (not shown).

Referring to FIG. 11, in some embodiments, the GUI of FIGS. 3-10, the fare price that is displayed on each calendar day for which results have been computed is a hypertext link either rendered with or without underlining (as shown in those figures). Clicking on the link brings up another web page 85 (FIG. 11) that renders results for a single day. (The illustration in FIG. 11 is from the above issued U.S. Pat. No. 7,346,526 and accordingly does not coincide with information contained in FIGS. 3-10, but is merely presented for illustration purposes.) The web page 85 provides two types of information: the details of the particular solution(s) that generated the price shown; and an overview of other options available on that day, which may involve different routings, different carriers, different departure times, and so forth. The web page 85 includes a table 87 that summarizes the travel options for a single solution set and day. The travel option summary table has multiple tabs 87a-87c that group summary information by airlines and number of stops and by flight times. Other tabs can be used to summarize other travel information according to other criteria such as class of service, safety of equipment, etc.

Selecting a cell (by clicking on a URL in one of FIGS. 3-10) displays, in a lower pane, a listing of the travel solutions for that particular cell. Each travel solution contains a 'details' URL link in the row of information devoted to that travel solution. Clicking on that link takes the user to a detailed description of that travel solution (not shown). Other arrangements are possible, for instance clicking on a price link in one of the calendar cells displays the results for the clicked-on day to the right of the calendar, rather than bringing up a new web page with just the results for the clicked-on day. This is useful for users who have computer monitors large enough to accommodate both the calendars and the single-day information on the screen at the same time.

It should not be appreciated that the GUI is produced from computer instructions that originate from, e.g., the travel application 16 or possible from the travel planning system 20. In the various configurations of the GUI 50 these configurations can be determined using inputs supplied by the user by the travel application 16 and sent to the client device as an updated web page or the travel application can send an application along with the appropriate data (some or all of the travel options that were determined stored in e.g., a compact structure) that is executed on the user device to render and modify the GUI 50.

Figure 12:
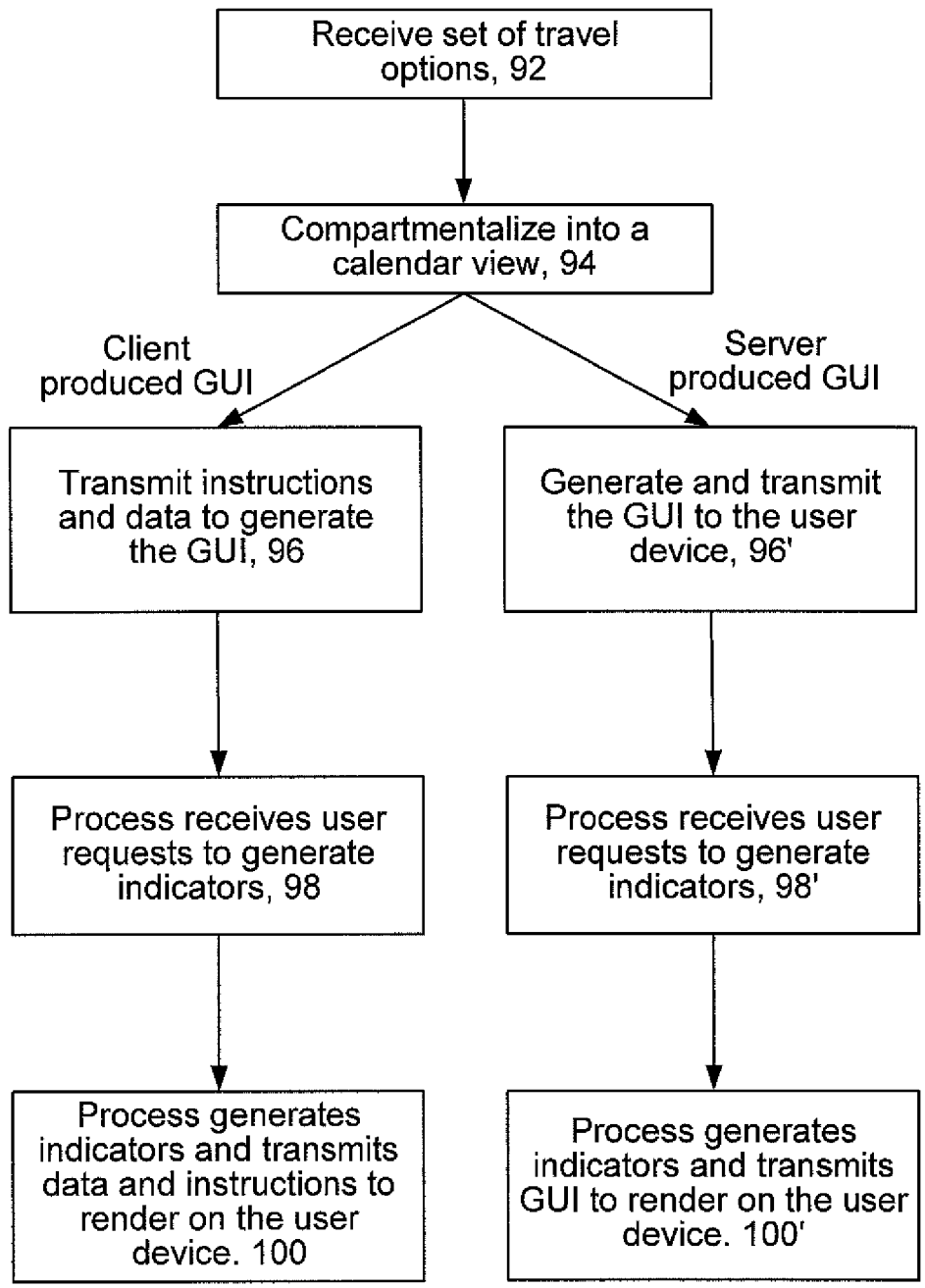
FIG. 12 is a flow chart.

Referring now to FIG. 12, a process 90 executed on a computer device is shown. The process 90 is used to display travel planning information on the user device. In one embodiment, a server receives 92 a set of travel options that have been determined by a travel planning system executing a travel planning application in response to a flexible date travel planning query or other travel planning query as illustrated by the choices given in FIG. 2. The server compartmentalizes 94 the travel options into a calendar view (generally as described in the above US Patent or using other techniques).

The process 90, thereafter can be further executed on the server or the client device. The server transmits 96 the GUI as computer instructions and data to render the user interface of FIGS. 3-10 or transmits 96' the GUI as web page that is rendered on the user device directly.

The process receives 98, 98' requests from the client device to transmit new data to the client system that produces the various indicators rendered on the client system in a web browser. The process on the client executes 100 instructions with the transmitted data and user input to render the indicators on the client device or the server produces 100' the GUI and transmits the GUI to be rendered on the client device. The GUI at this point graphically traverses selected date cells that correspond to a selected length of stay, in response to a user indicating a date of departure and so forth.

When the server transmits instructions to the user system to render the user interface on a display of the client system, these instructions (applets or the like) render the calendar view with the various information described above and updates the display with the various indicators in accordance with the user interaction with the interface, typically via a user indictor device, such as, a computer mouse, keyboard, a trackball, a touch pad or similar device that indicates a user's selection of a departure day. Otherwise this user data is sent back to the server if the server is generating and transmitting the GUI.

The instructions are configurable by the user data including a preliminary selection of a day of departure corresponding to one of the date cells, and can accommodate multiple lengths of stay to render multiple indicators. The process produces the visual effects for uniquely indicating the date cells corresponding to a journey that includes the day of departure, the day of return as determined by the selected length of stay and the day of departure, and any intervening days, with the instructions configurable by client data including an active selection of a day of departure corresponding to one of the date cells.

The process can also cause the user device to render on the display a filter region juxtaposed the calendar view, the filter region comprising a plurality of filter elements that enables a user to select or de-select one or more of the filter elements in the region causing a concomitant change in fare prices rendered in the calendar view according to the filter elements selected. The process also includes generation of the user interface in FIG. 11, in a similar manner as in the above patent.

The components of the travel planning arrangement 10 can be implemented, at least in part, in digital electronic circuitry, analog electronic circuitry, or in computer hardware, firmware, software, or in combinations of them. The components of the travel planning arrangement 10, including web server 17 and travel application 16 can be implemented as a computer program product, i.e., a computer program tangibly embodied in a machine-readable storage device, such as memory, for execution by, or to control the operation of, data processing apparatus, e.g., a programmable processor, a computer, or multiple computers. The client 14 may be any kind of data processing device including a computer, e.g., desk top computer or notebook computer, a cell phone, PDS, or other mobile computing device.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the travel planning arrangement 10 can be performed by one or more programmable processors executing a computer program to perform functions of the invention by operating on input data and generating an output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Machine-readable media suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, all of above examples could make use of different and/or additional travel query fields. Accordingly, other embodiments are within the scope of the following claims.

What is claimed is:

1. A computer-implemented method to display travel planning information on a display device, the method comprising:
receiving, using one or more computing devices, a user selected earliest departure date, a user selected latest departure date, and a user selected length of stay;
in response to receiving the user selected earnest departure date, the user selected latest departure date, and the user selected length of stay, transmitting, using the one or more computing devices, instructions causing to display a user interface on a display device to render date cells corresponding to the user selected earliest departure date, the user selected latest departure date, each possible departure date between the user selected earliest departure date and the user selected latest departure date, and a lowest fare value for each date cell based upon the user selected length of stay, wherein the displayed user interface comprises a depiction of a calendar view of at least a portion of a month including the date cells corresponding to calendar days of the month;
receiving, using the one or more computing devices, a selection of a particular one of the date cells corresponding to a user selected date of departure; and
in response to receiving the user selected date of departure, transmitting, using the one or more computing devices, instructions causing an update to the displayed user interlace on the display device, the updated user interface comprising a visual indicator that starts at a date cell of the calendar view corresponding to the user selected date of departure and automatically extends across the date cells corresponding to calendar days that the user would be traveling according to the user selected length of stay.

2. The method of claim 1, wherein the user interface further comprises a value shown within each of a plurality of the date cells, reflecting the lowest fare for travel departing on the date represented by the date cell and for the user selected length of stay.

3. The method of claim 1, wherein the visual indicator is automatically rendered and concurrently displayed in the user interface of the display upon receipt of an indication that the user selected date of departure has been actively selected by a user indicating device.

4. The method of claim 3, wherein the indication that the user selected date of departure has been actively selected by the user indicating device comprises an indication that a cursor has been hovered over an indicator of the one of the possible departure dates.

5. The method of claim 1, further comprising:
identifying the lowest fare among fares for travel departing on the user selected earliest departure date, the user selected latest departure date, and each possible departure date between the user selected earliest departure date and the user selected latest departure date according to the user selected length of stay; and
in response to determining that the fare for travel departing on the user selected date of departure that has been actively selected is not a lowest fare among the fares for travel departing on the user selected earliest departure date, the user selected latest departure date, or one of the possible departure dates between the user selected earliest departure date and the user selected latest departure date according to the user selected length of stay, transmitting computer instructions for causing to be rendered on the display, concurrently with the fare for travel departing on the user selected date of departure that has been actively selected, a visual effect for indicating that the lowest fare is inapplicable.

6. The method of claim 5, wherein the visual effect indicating that the lowest fare is inapplicable comprises a strikethrough notation on the lowest fare.

7. A computer program product residing on a non-transitory computer readable medium to display travel planning information on display devices, the computer program product comprising instructions to:
receive a user selected earliest departure date, a user selected latest departure date, and a user selected length of stay;

in response to receiving the user selected earliest departure date, the user selected latest departure date, and the user selected length of stay, transmit instructions causing to display a user interface on a display device, the user interface comprising date cells corresponding to the user selected earnest departure date, the user selected latest departure date, each possible departure date between the user selected earliest: departure date and the user selected latest departure date, and a lowest fare value for each date cell based upon the user selected length of stay, wherein the displayed user interface comprises a depiction of a calendar view of at least a portion of a month including the date cells corresponding to calendar days of the month;

receive a selection of a particular one of the date cells corresponding to a user selected date of departure; and in response to receiving the user selected date of departure, transmit instructions causing an update to the displayed user interface on the display device, the updated user interface comprising a visual indicator that starts at a date cell of the calendar view corresponding to the user selected date of departure and automatically extends across the date cells corresponding to calendar days that the user would be traveling according to the user selected length of stay.

8. The computer program product of claim 7, wherein the user interface further comprises a value shown within each of a plurality of the date cells reflecting the lowest fare for travel departing on the date represented by the date cell and for the user selected length of stay.

9. The computer program product of claim 7, wherein the visual indicator is automatically rendered and concurrently displayed in the user interface of the display upon receipt of an indication that the user selected date of departure has been actively selected by a user indicating device.

10. The computer program product of claim 9, wherein the indication that the user selected date of departure has been actively selected by the user indicating device comprises an indication that a cursor has been hovered over an indicator of the one of the possible departure dates.

11. The computer program product of claim 7, further comprising instructions to:

identify the lowest fare among fares for travel departing on the user selected earliest departure date, the user selected latest departure date, and each possible departure date between the user selected earliest departure date and the user selected latest departure date according to the user selected length of stay; and in response to determining that the fare for travel departing on the user selected date of departure that has been actively selected is not a lowest fare among the fares for travel departing on the user selected earliest departure date, the user selected latest departure date, or one of the possible departure dates between the user selected earliest departure date and the user selected latest departure date, transmit computer instructions for causing to be rendered on the display, concurrently with the fare for travel departing on the user selected date of departure that has been actively selected, a visual effect for indicating that the lowest fare is inapplicable.

12. The computer program product of claim 11, wherein the visual effect indicating that the lowest fare is inapplicable comprises a strikethrough notation on the lowest fare.

13. A computer apparatus comprising:

one or more processors; and memory coupled to the one or more processors, the one or more processors configured to:

receive a user selected earliest departure date, a user selected latest departure date, and a user selected length of stay;

in response to receiving the user selected earnest departure date, the user selected latest departure date, and the user selected length of stay, transmit instructions causing to display a user interface on a display device, the user interface comprising date cells corresponding to the user selected earliest departure date, the user selected latest departure date, each possible departure date between the user selected earliest departure date and the user selected latest departure date, and a lowest fare value for each date cell based upon the user selected length of stay, wherein the displayed user interface comprises a depiction of a calendar view of at least a portion of a month including the date cells corresponding to calendar days of the month;

receive a selection of a particular one of the date cells corresponding to a user selected date of departure; and in response to receiving the user selected date of departure, transmit instructions causing an update to the displayed user interface on the display device, the updated user interface comprising a visual indicator that starts at a date cell of the calendar view corresponding to the user selected date of departure and automatically extends across the date cells corresponding to calendar days that the user would be traveling according to the user selected length of stay.

14. The computer apparatus of claim 13, wherein the user interface further comprises a value shown within each of a plurality of the date cells, reflecting the lowest fare for travel departing on the date represented by the date cells and for the user selected length of stay.

15. The computer apparatus of claim 13, wherein the visual indicator is automatically rendered and concurrently displayed in the user interface of the display upon receipt of an indication that the user selected date of departure has been actively selected by a user indicating device.

16. The computer apparatus of claim 15, wherein the indication that the user selected date of departure has been actively selected by the user indicating device comprises an indication that a cursor has been hovered over an indicator of the one of the possible departure dates.

17. The computer apparatus of claim 13, the one or more processors configured to:

identify the lowest fare among fares for travel departing on the user selected earliest departure date, the user selected latest departure date, and each possible departure date between the user selected earliest departure date and the user selected latest departure date according to the user selected length of stay; and in response to determining that the fare for travel departing on the user selected date of departure that has been actively selected is not a lowest fare among the fares for travel departing on the user selected earliest departure date, the user selected latest departure date, or one of the possible departure dates between the user selected earliest departure date and the user selected latest departure date according to the user selected length of stay, transmit computer instructions for causing to be rendered on the display, concurrently with the fare for travel departing on the user selected date of departure that has been actively selected, a visual effect for indicating that the lowest fare is inapplicable.

18. The computer apparatus of claim 17, wherein the visual effect indicating that the lowest fare is inapplicable comprises a strikethrough notation on the lowest fare.

\* \* \* \* \*